US006938208B2

(12) United States Patent
Reichardt

(10) Patent No.: US 6,938,208 B2
(45) Date of Patent: Aug. 30, 2005

(54) ELECTRONIC PROGRAM GUIDE WITH GRAPHIC PROGRAM LISTINGS

(75) Inventor: M. Scott Reichardt, Tulsa, OK (US)

(73) Assignee: United Video Properties, Inc., Tulsa, OK (US)

( * ) Notice: Subject to any disclaimer, the term of this patent is extended or adjusted under 35 U.S.C. 154(b) by 590 days.

(21) Appl. No.: 09/754,753

(22) Filed: Jan. 4, 2001

(65) Prior Publication Data

US 2001/0030661 A1 Oct. 18, 2001

Related U.S. Application Data

(60) Provisional application No. 60/174,443, filed on Jan. 4, 2000.

(51) Int. Cl.[7] .................................................. G09G 5/00
(52) U.S. Cl. ...................................... 715/719; 715/721
(58) Field of Search ................................. 715/716, 719, 715/720, 721, 722; 345/716, 719, 721; 725/39, 42

(56) References Cited

U.S. PATENT DOCUMENTS

| 5,635,978 | A | | 6/1997 | Alten et al. ..................... 348/7 |
| 6,141,003 | A | | 10/2000 | Chor et al. .................... 345/327 |
| 6,147,714 | A | * | 11/2000 | Terasawa et al. ............ 348/564 |
| 6,160,546 | A | | 12/2000 | Thompson et al. .......... 345/327 |
| 6,172,677 | B1 | * | 1/2001 | Stautner et al. .............. 345/716 |
| 6,388,714 | B1 | * | 5/2002 | Schein et al. ................ 348/563 |
| 6,405,371 | B1 | * | 6/2002 | Oosterhout et al. ............ 725/39 |
| 6,421,067 | B1 | * | 7/2002 | Kamen et al. ............... 345/719 |

FOREIGN PATENT DOCUMENTS

| WO | WO 95/32585 | 11/1995 | ............ H04N/7/10 |
| WO | WO 96/34467 | 10/1996 | ............ H04N/1/00 |
| WO | WO 99/04561 | 1/1999 | ............ H04N/5/50 |
| WO | WO 99/60783 | 11/1999 | ............ H04N/5/50 |

OTHER PUBLICATIONS

Patent abstract for Japanese patent JP 10 065978, Patent Abstracts Of Japan, vol. 1998, No. 08, Jun. 3, 1998.
Patent abstract for Japanese patent JP 11 032272, Patent Abstracts Of Japan, vol. 1999, No. 05, May 31, 1999.
Patent abstract for Japanese patent JP 11 205711, Patent Abstracts Of Japan, vol. 1999, No. 12, Jul. 30, 1999.
David M. Rudnick, United States Patent Application for "Interactive Television Program Guide System Having Graphic Arrangements of Program Event Regions," filed Apr. 1, 1999, U.S. Appl. No.: 09/283,681.

* cited by examiner

Primary Examiner—Steve Sax
Assistant Examiner—Thanh Vu
(74) Attorney, Agent, or Firm—Fish & Neave IP Group of Ropes & Gray LLP

(57) ABSTRACT

Electronic program guides in which program listings may be graphically presented and in which sponsors and celebrities of those programs may be identified are provided. The electronic programs guides may be passive television program guides, interactive television program guides, and/or on-line television program guides. Television show text information, logos and/or trademarks, celebrity images, affiliation indicators, and advertisements may be present in the program listings to enhance the electronic program guides.

66 Claims, 12 Drawing Sheets

ELECTRONIC PROGRAM GUIDE WITH GRAPHIC PROGRAM LISTINGS

CROSS REFERENCE TO RELATED APPLICATION

This application claims the benefit of U.S. Provisional application No. 60/174,443, filed Jan. 4, 2000, which is hereby incorporated by reference herein in its entirety.

BACKGROUND OF THE INVENTION

This invention relates to electronic program guides, and more particularly, to promotional techniques for program guides.

Electronic program guides are used to provide program listings information to television viewers. Program listings information may include program titles, scheduled broadcast times and channels, program descriptions, etc.

One form of electronic program guide is the passive television program guide. Passive television program guides, such as the TV Guide Channel, are typically provided by cable system head-ends or other television distribution facilities on a dedicated television channel. Passive program guides may provide program listings in the form of an automatically scrolling or paged list. Viewers may access the listings of the passive program guide by tuning to the appropriate dedicated television channel with a standard television or set-top box.

Another form of electronic program guide is the interactive television program guide. Interactive television program guides, such as TV Guide Interactive and Gemstar Guide Plus, are typically implemented on set-top boxes or other user television equipment with suitable processing circuitry. Users typically interact with such interactive television program guides using a remote control. Features that are often offered by interactive television program guides include the capability to set favorite channels or programs, the capability to set reminders for programs of interest, and the ability to establish parental controls.

Yet another form of electronic program guide is the on-line television program guide. On-line television program guides, such as TV Guide Online, allow users to access program listings information over the Internet using a web browser or similar interface. When using these guides, users frequently may click on program titles within the guides to view additional information such as a detailed program description.

All of these variations of electronic program guides provide program listings information to their viewers or users in the form of text. This can be seen in passive products such as the TV Guide Channel or Americast's passive program guide, both of which feature a text-based scrolling grid of listings. Text-based listings are also seen in Internet guides such as the GIST on-line program guide and the Click TV on-line program guide. Text-based listings are also seen in interactive program guides such as Starsight and Americast interactive program guides.

Nevertheless, there is a need for a more aesthetically pleasing and eye-catching methods for presenting electronic program guides. Preferably these methods would incorporate program listings that are easy to identify and that indicate relationships between sponsors and celebrities of those programs.

It is therefore an object of this invention to provide an electronic program guide that presents program listings as graphical images that can meet these needs.

SUMMARY OF THE INVENTION

This and other objects of the invention are accomplished in accordance with the principles of the present invention by providing electronic program guides in which program listings may be graphically presented and in which sponsors and celebrities of those programs may be identified. The electronic programs guide may be passive television program guides, interactive television program guides, and/or on-line television program guides. Television show text information, information icons, graphic logos and/or trademarks, celebrity images, affiliation indicators, and advertisements may be present in the program listings to enhance the electronic program guides.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
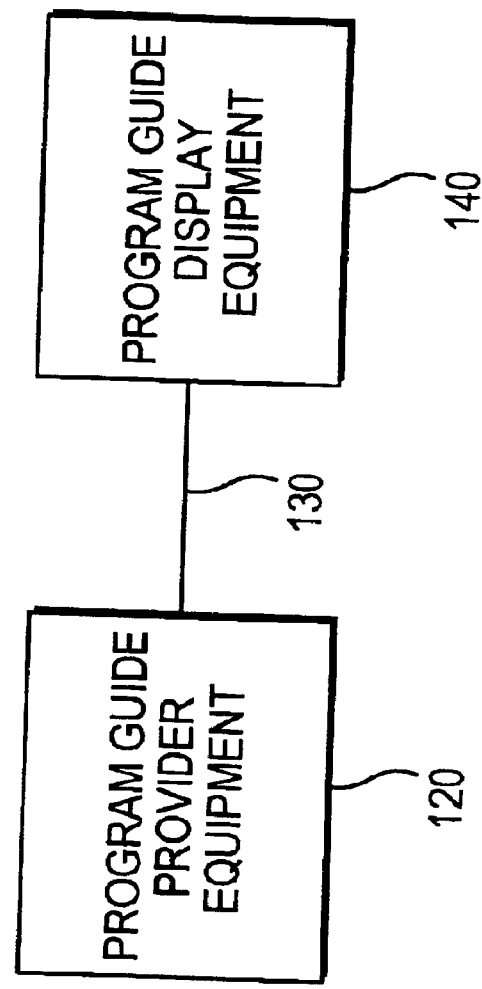
FIG. 1 is a schematic diagram of program guide provider equipment, a communication link, and program guide display equipment that may be used in accordance with some embodiments of the present invention.

Turning first to FIG. 1, a system 100 for presenting an electronic program guide is illustrated. System 100 may be used to implement any form of electronic program guide, including a passive television program guide, an interactive television program guide, and an on-line television program guide. As shown, system 100 may include program guide provider equipment 120, a communication link 130, and program guide display equipment 140.

When implemented as a passive television program guide, system 100 may be implemented with equipment 120 being a computer and video generator at a cable head-end, link 130 being a one-way cable television distribution system, and equipment 140 being a television. Program guide data then may be formatted by the computer, converted to a video signal by the video generator, transmitted through the cable television distribution system, and then received by and displayed on the television.

When implemented as an interactive television program guide, system 100 may be implemented with equipment 120 being a server at a cable head-end or other location, link 130 being a one-way or two-way cable television distribution system, and equipment 140 being an advanced set-top box and a television. Program guide data may the be transmitted from the server through the cable television distribution system, received by the set-top box, displayed on the television, and interacted with by a user using a remote control of the set-top box.

When implemented as an on-line television program guide, system 100 may be implemented with equipment 120 being a server, link 130 being a computer network that may include the Internet, and equipment 140 being a computer that is capable of communicating with the server in equipment 120. Program guide data may then be formed by the server into a web page, transmitted by the server through the computer network to the computer, displayed on a computer monitor connected to the computer to the user, and interacted with by the user using a mouse and/or keyboard attached to the computer.

Obviously, many variations of suitable equipment may be used to provide an electronic program guide in accordance with the present invention without departing from the spirit and scope of the invention. For example, the present invention may be implemented in a satellite television system.

Figure 2:
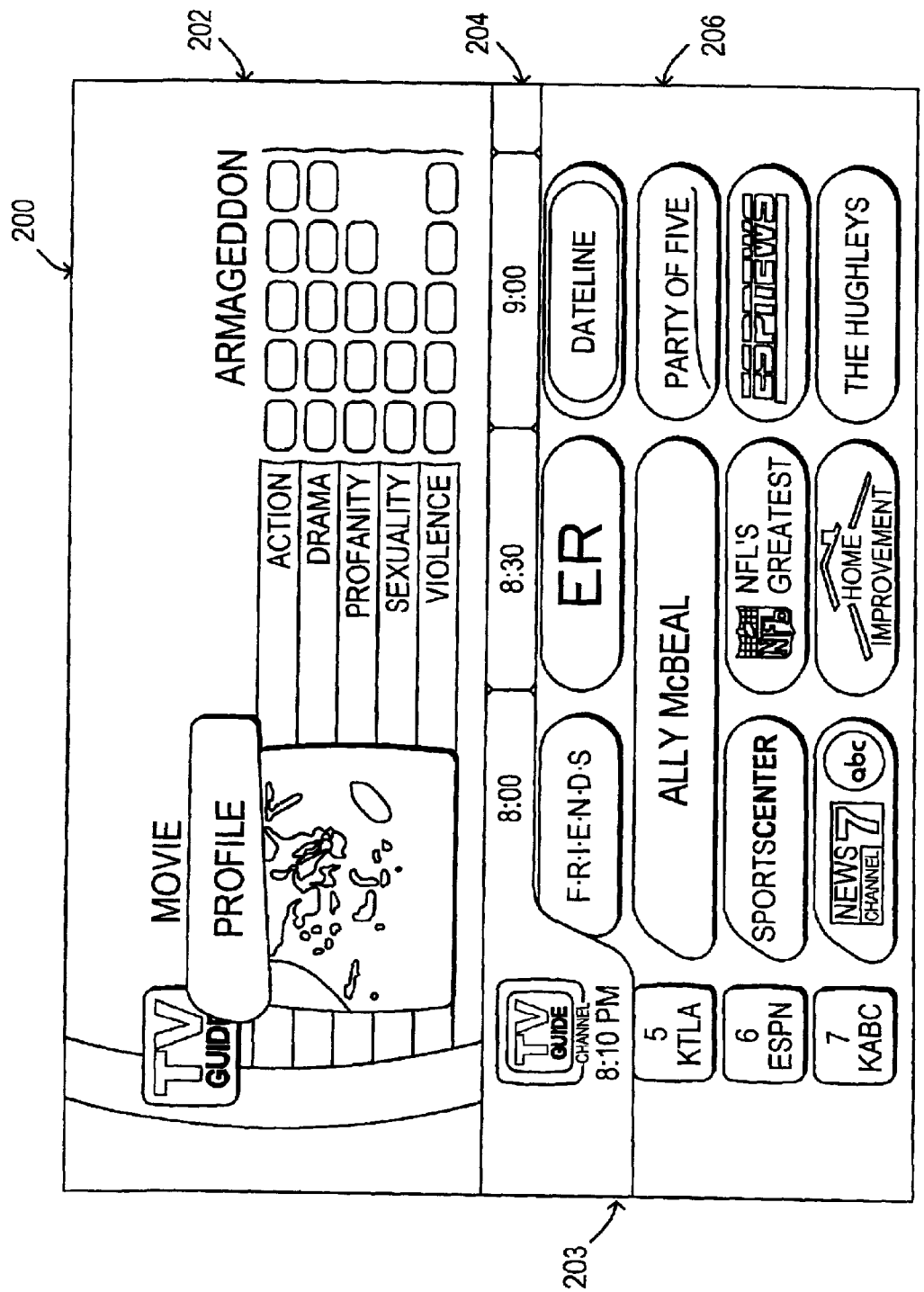
FIG. 2 is an illustration of an electronic program guide display screen that may be presented in accordance with some embodiments of the present invention.

Turning to FIG. 2, one embodiment of an electronic program guide display 200 in accordance with the present invention is illustrated. As shown, program guide display 200 may include a top half 202 and a bottom half 203. Top half 202 may include promotional videos, advertisements, graphics, text, icons, and/or any other suitable content. Bottom half 203 may include a time bar 204 that indicates the current time and time slots for television programs, and an information area 206 that indicates information relating to television programs that are on in those time slots. The content provided in top half 202 of display 200 may or may not correspond to the information relating to television programs that is provided in bottom half 203 of display 200.

Figure 3:
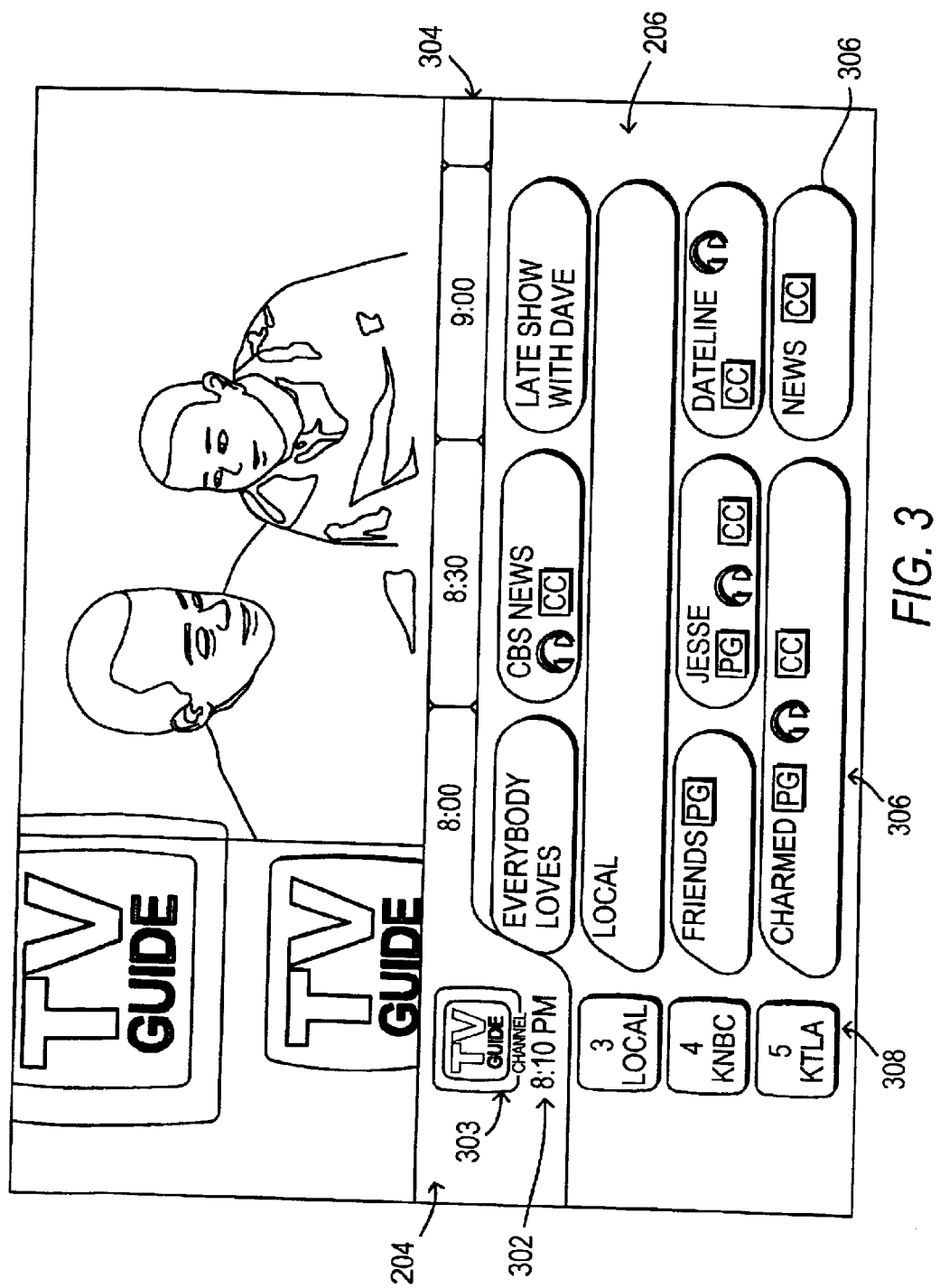
FIG. 3 is an illustration of an electronic program guide display screen showing text information and information icons that may be presented in accordance with some embodiments of the present invention.

As illustrated in FIG. 3, time bar 204 preferably includes a clock 302 and time slots 304. Time bar 204 may also include a guide provider logo 303 to indicate to the viewer the identity of the provider of the guide. Time slots 304 provide an indication of when programs were playing, are playing, and/or will be playing. Time slots 304 may be implemented in any suitable delineation of time segments. For example, time slots 304 may be implemented in half-hour segments (e.g., one segment may read 8:00, the next may read 8:30, and another may read 9:00). The time slots may also indicate when the times indicated by the time slots are in the past.

As shown, information area 206 may include program listings for the electronic program guide. In some embodiments, the program listing may be displayed as buttons 306. Buttons 306 may include text information pertaining to each program, such as the title of the program, a description of the program, names of actors in the program, etc, and informational icons that indicate the rating of the program (e.g., PG, G, TV-13, etc.), whether the program is in stereo, whether the program is closed-captioned, whether the program is in Dolby, whether the program is broadcast in High-Definition Television (HDTV), etc. Buttons 306 may be color coded to indicate what category of show each represents. Each button 306 may be aligned with a channel indicator 308 to indicate what channel a corresponding program is on. Each channel indicator 308 may indicate the channel number, call letters, name, logo, and/or any other suitable indicator of the channel indicator. Each channel indicator 308 may also be in a similar style to guide provider logo 303.

Although the program listings are shown herein as being displayed in buttons 306, program listings may be displayed in any suitable graphical element, such as a grid cell.

Figure 4:
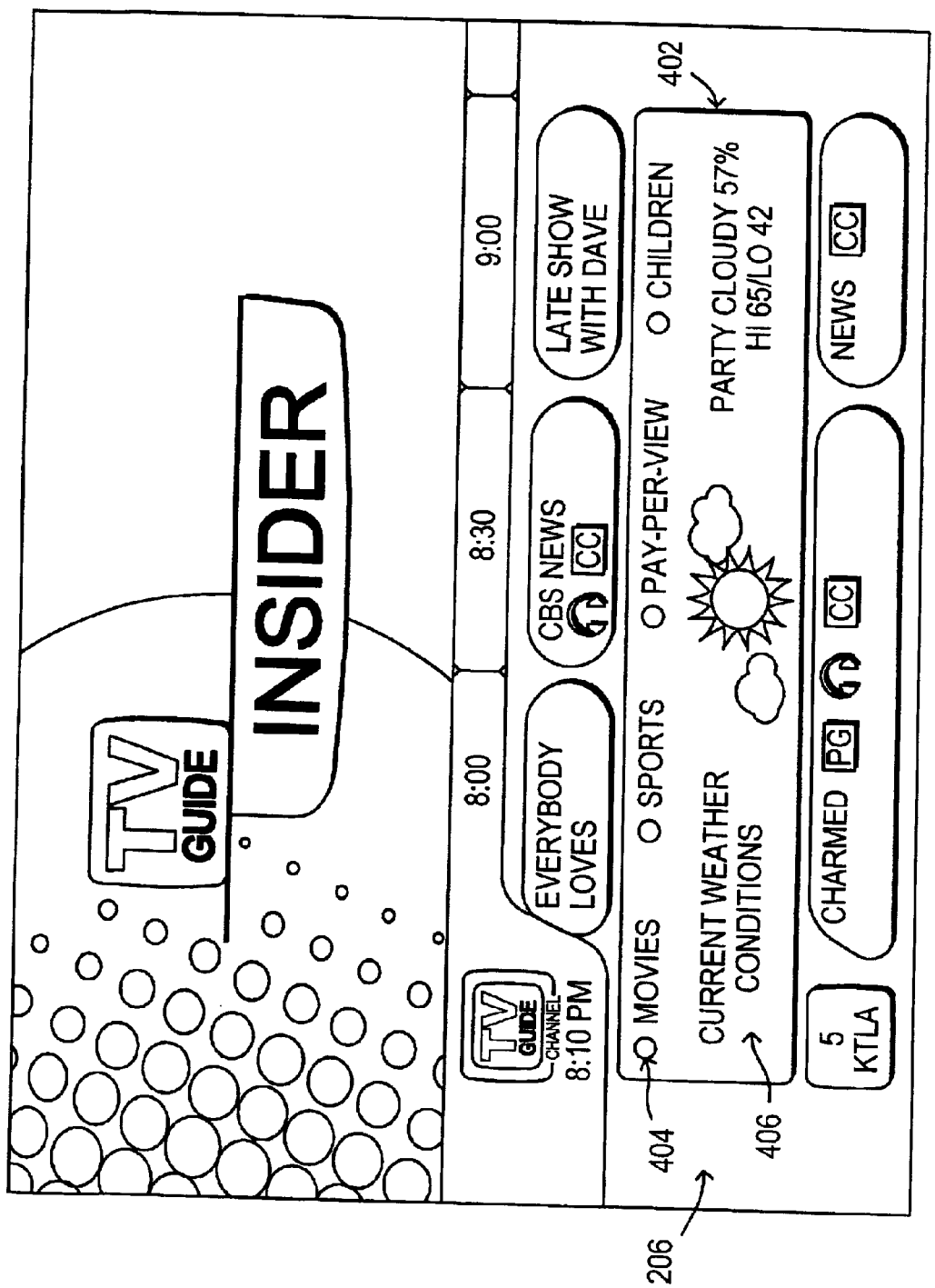
FIG. 4 is an illustration of an electronic program guide display screen showing an information tray that may be presented in accordance with some embodiments of the present invention.
Figure 5:
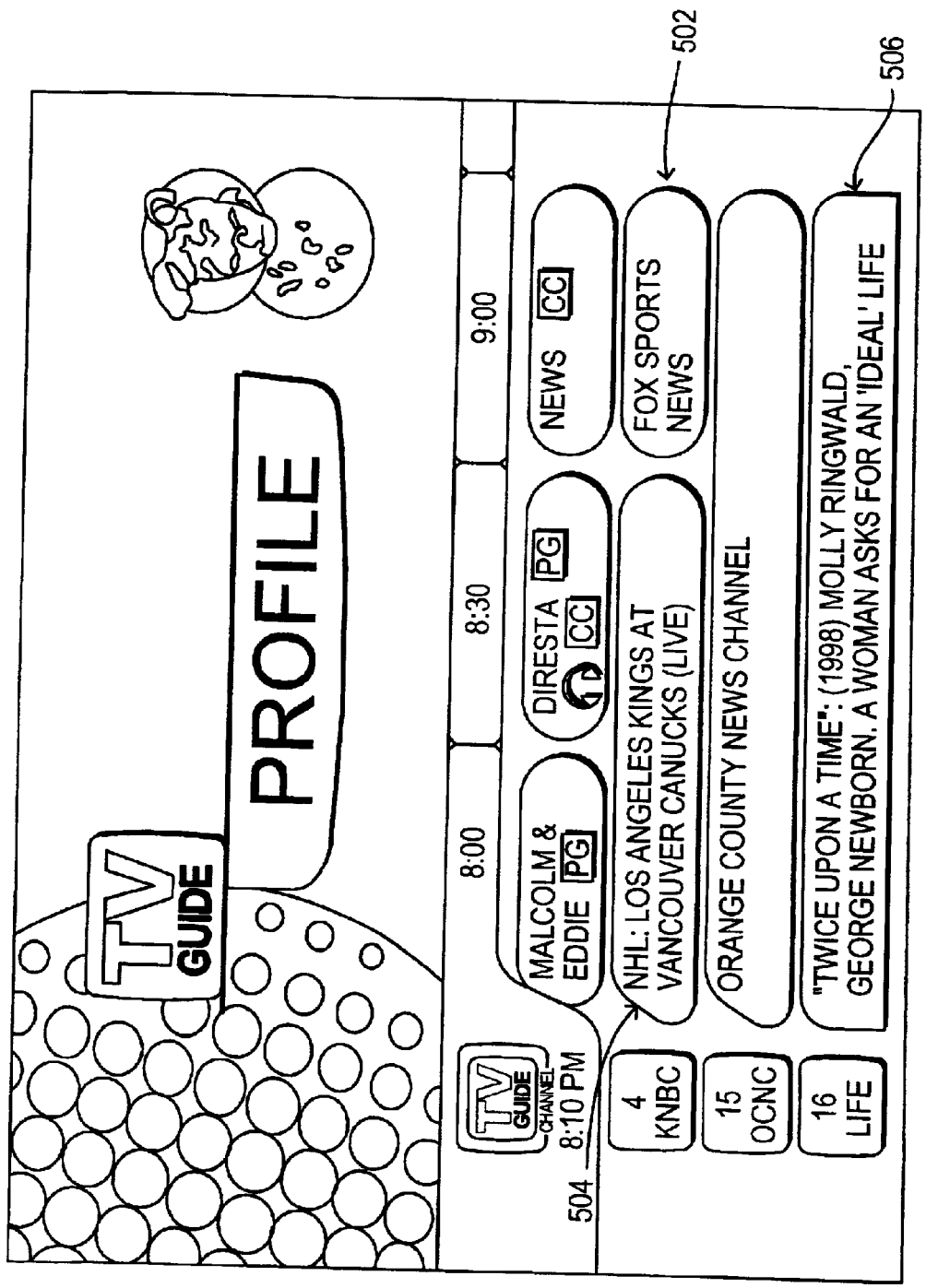
FIG. 5 is an illustration of an electronic program guide display screen showing program information with colored backgrounds that may be presented in accordance with some embodiments of the present invention.

An information tray 402 may also be included in information area 206 as shown in FIG. 4. Information tray 402 may contain a legend 404 that indicates the scheme used for color-coding buttons 306, if any. For example, legend 404 may indicate that buttons 306 corresponding to sports programs are indicated in green and that buttons 306 corresponding to movies are indicated in red. Thus, as shown in FIG. 5, buttons 502 and 504 would be colored green and button 506 would be colored red. Information tray 402 may also display information such as weather and news 406.

Figure 6:
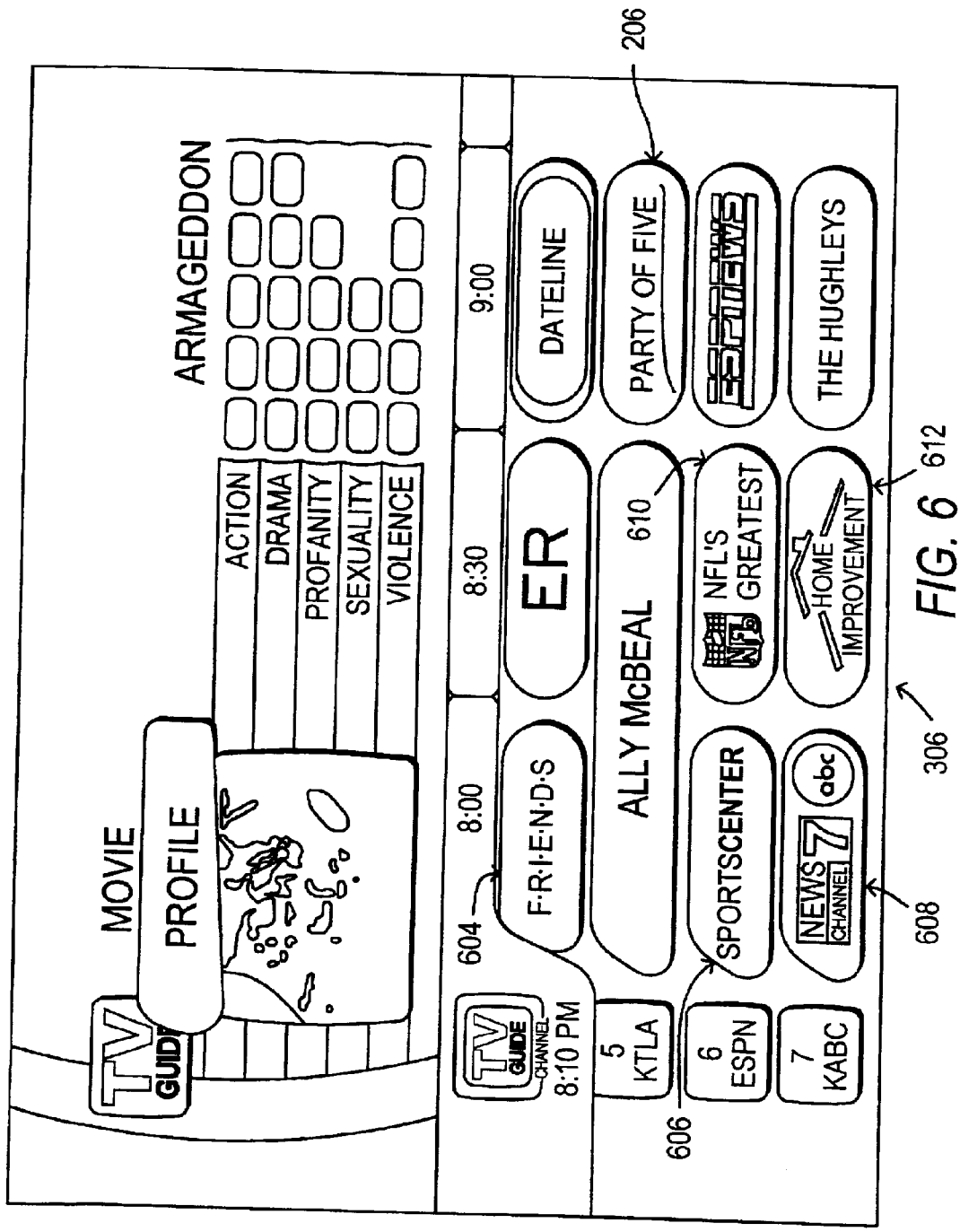
FIG. 6 is an illustration of an electronic program guide display screen showing program logos and affiliation indicators that may be presented in accordance with some embodiments of the present invention.

Turning to FIG. 6, a graphical approach to displaying program information in buttons 306 of information area 206 is shown. As illustrated, buttons 306 include graphical elements such as logos and/or trademarks for the programs identified by the buttons that may be used in addition to or instead of basic text. For example, button 604 contains the graphic logo "F·R·I·E·N·D·S" instead of the basic text "Friends". Similarly, button 606 contains the graphic logo "SportsCenter" (wherein "Center" is in bold letters) instead of the basic text "SportsCenter" (wherein none of the letters are bold letters). Button 612 contains the graphic logo for "Home Improvement" wherein the words "Home Improvement" are incorporated into a graphic representation of a house rather than simply being presented as ordinary text. By displaying buttons 306 with graphic logos and/or trademarks of the corresponding programs, viewers can more easily identify programs that are of interest to them. For this reason, program providers may be willing to pay to have their programs presented as logos and/or trademarks in the program guide in addition to or instead of basic text.

Like buttons 306 with text content, buttons 306 with graphic content may have colored backgrounds to indicate to the viewer what type of program is showing. For example, "F·R·I·E·N·D·S" button 604 may have a yellow background to indicate that it corresponds to a situation comedy (sitcom) or drama. "SportsCenter" button 606 may be colored green to indicate that it corresponds to sports related programming.

Buttons 306 may also indicate affiliation of programs and/or the program guide with an affiliated entity by providing graphical element affiliation indicators within the buttons. For example, buttons 306 may include one or more affiliation indicators to indicate network affiliation (e.g., ABC, NBC, etc.), sports team affiliation (e.g., Green Bay Packers, Denver Broncos, New York Yankees, etc.), corporate affiliation (e.g., NFL, NASCAR, National Geographic, etc.), event affiliation (e.g., Super Bowl, Daytona 500, Kentucky Derby, etc.), guide affiliation (e.g., TV Guide, etc.), etc. Affiliation indicators may indicate sponsorship of a program by a sponsor, or may indicate any other affiliation between an entity and a program.

FIG. 6 shows examples buttons 306 with affiliation indicators. Button 608 indicates a network affiliation of the program "News Channel 7" with the ABC Network, and button 610 indicates a corporate affiliation of the program "NFL's Greatest" with the NFL. These are just two possible variations of including affiliation indicators in buttons 306. Other variations could include multiple affiliation indicators in the same button.

Figure 7:
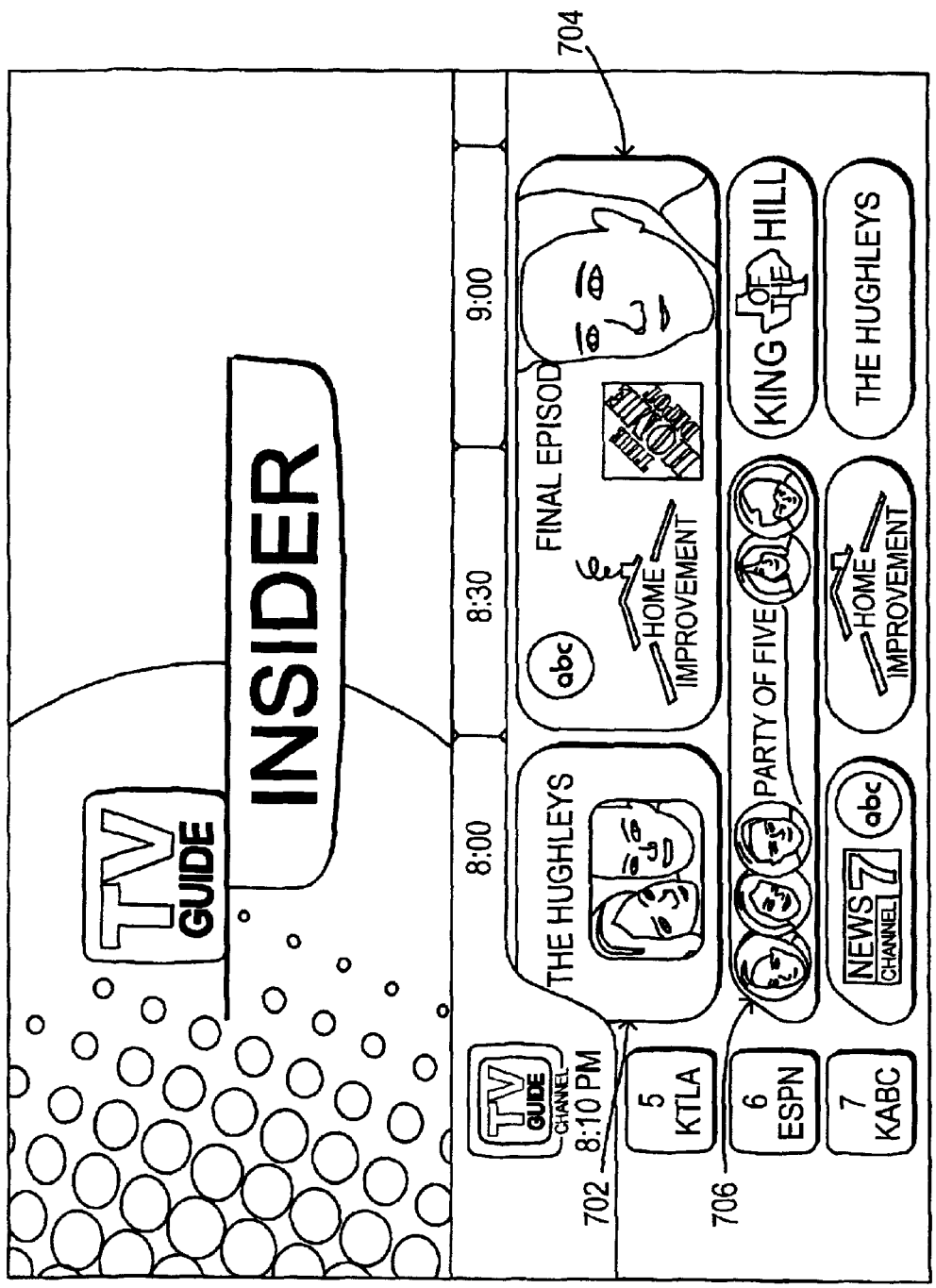
FIG. 7 is an illustration of an electronic program guide display screen showing celebrity images that may be presented in accordance with some embodiments of the present invention.

Button 306 may also include graphical element celebrity images as shown in FIG. 7. As illustrated, buttons 702, 704, and 706 have images of celebrities in the buttons. Celebrity images on these buttons help viewers identify programs because viewers associate celebrity images with programs. Button 706, for instance, shows the faces of the cast members of the show "Party of Five." As is evident in FIG. 7, the sizes of buttons in the program guides of the present may be any suitable size or shape and need not be of uniform size or shape. As is also evident in FIG. 7, especially from button 704, many features of the invention can be used in the same button. As illustrated, button 704 is a large button, and includes a program logo, an affiliation indicator for a television network affiliation, an affiliation indicator for a corporate affiliation (possibly a sponsor), text information, and a celebrity image.

Figure 8:
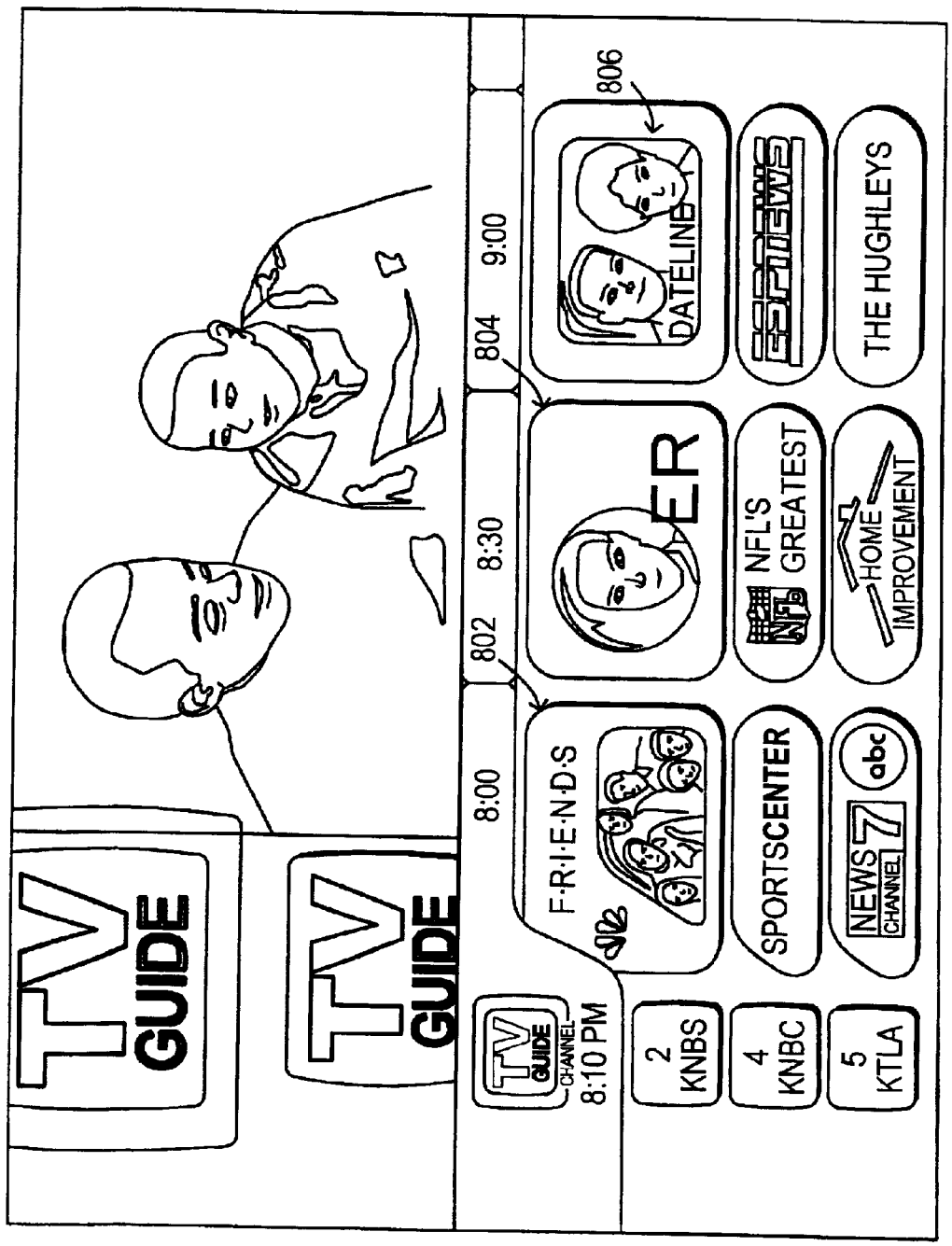
FIG. 8 is an illustration of another electronic program guide display screen showing celebrity images that may be presented in accordance with some embodiments of the present invention.

Other examples of celebrity images within buttons are shown in FIG. 8. As can be seen, in button 802, a program logo, network affiliation indicator, and a celebrity image are all included. Alternatively, as shown in button 804, only a program logo and a celebrity image may be used. As yet another alternative, a program logo may be positioned within a celebrity image as shown in button 806.

By providing logos, affiliation indicators, and celebrity images in buttons, the program guide of the present invention provides increased readability. Because less time is spent reading the program listings, viewers can focus more time looking at other parts of the screen. This is particularly useful because this provides an incentive for companies to advertise in the program guide and/or sponsor programs indicated in buttons 306. In order to provide more space for advertisements, bigger channel buttons may be implemented in the program guide.

Figure 9:
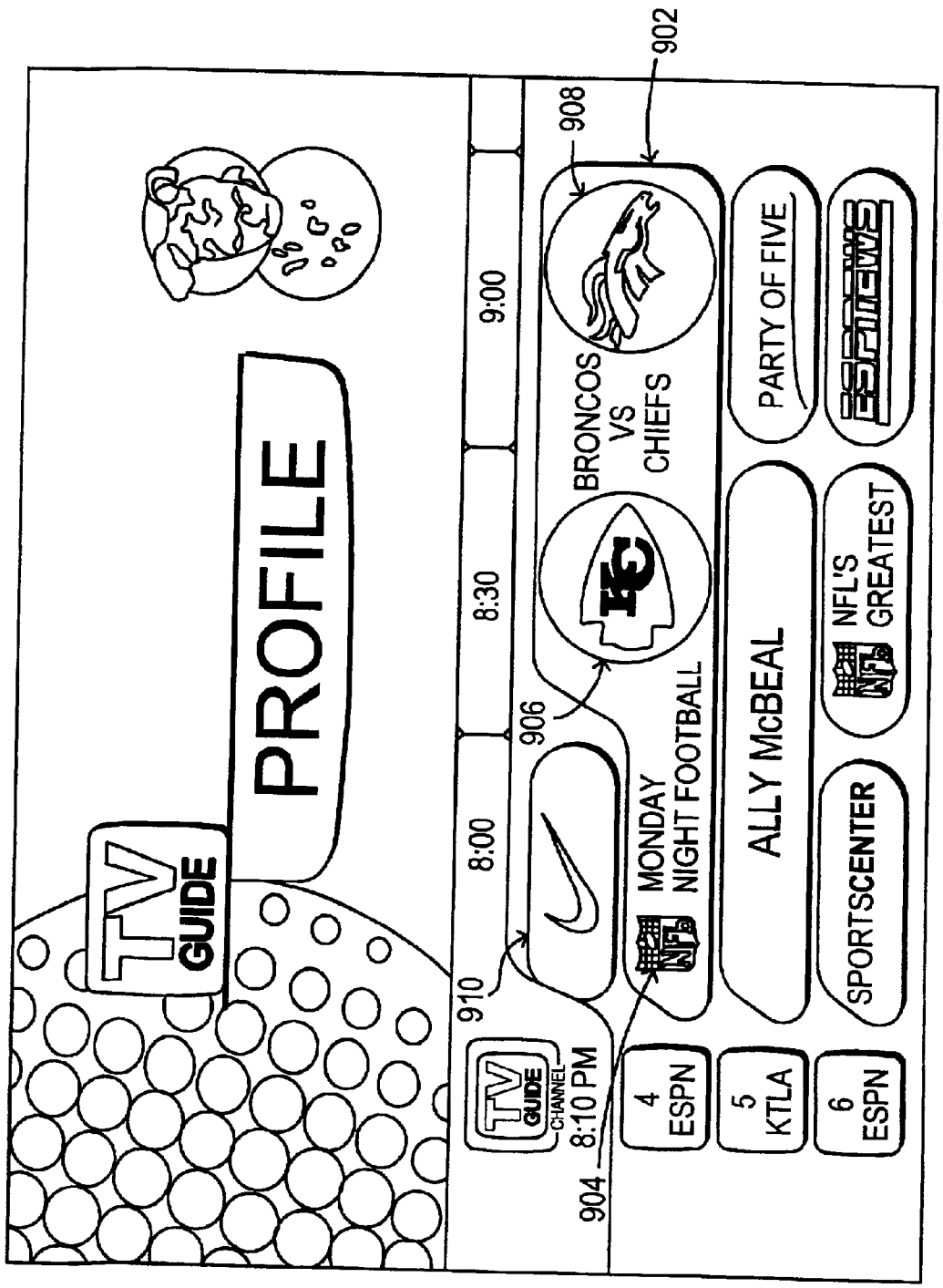
FIG. 9 is an illustration of an electronic program guide display screen showing affiliation indicators and an advertisement button that may be presented in accordance with some embodiments of the present invention.

Turning to FIG. 9, a large button 902 is shown. As illustrated, button 902 indicates that on the television program "Monday Night Football," the Denver Broncos are playing the Kansas City Chiefs. To help the viewer quickly identify this football game, affiliation indicators 904, 906, and 908 are included in button 902. Indicator 904 indicates that this program is affiliated with the National Football League, and indicators 906 and 908 indicate the logos of the Kansas City Chiefs and Denver Broncos, respectively.

As can also be seen in FIG. 9, button 902 is not of uniform shape in order to facilitate the inclusion of an advertising button 910. As shown, button 910 includes a "Nike Swoosh" advertising element that may be used to advertise various sporting goods available from Nike, Inc. Because Nike provides sporting goods, including advertising button 910 with an advertising element near button 902, which shows information for an athletic event, may be an effective advertising mechanism. Advertising elements may be used in any type of button, information tray, and/or any other portion of the electronic program guides.

Buttons 306 may also include promotional slogans to indicate significant events. Slogans may include phrases such as "Final Episode," "Season Finale," or any other suitable phrase.

Figure 10:
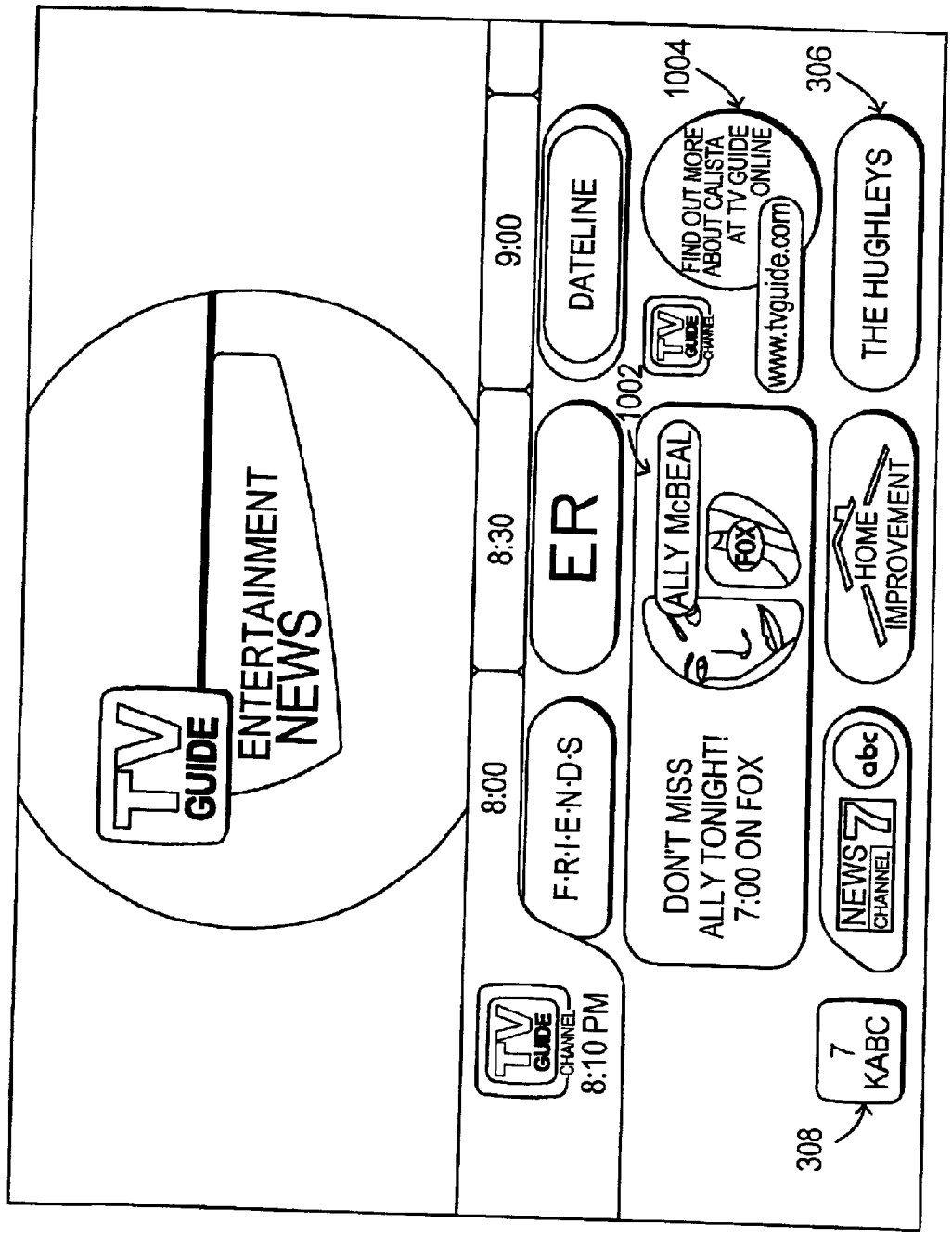
FIG. 10 is an illustration of an electronic program guide display screen showing promotion buttons that may be presented in accordance with some embodiments of the present invention.

Turning to FIG. 10, two promotion 1002 and 1004 buttons that may also be used in the electronic program guides of the present invention are shown. As illustrated, buttons 1002 and 1004 are not displayed with a corresponding channel indicator 308 like buttons 306. Because buttons 1002 and 1004 are not displayed with a channel indicator 308, these buttons may be used to promote or advertise any event, goods, service, etc. irrespective of whether the event, goods, or service is a related to a television program. Nevertheless, as shown, button 1002 is promoting a television program "Ally McBeal." Within button 1002 are a slogan "Don't miss Ally tonight!", a logo "Ally McBeal", an affiliation indicator "FOX", a celebrity image of Calista Flockhart, and text program information "7:00 on FOX". Promotion button 1004, as illustrated, is associated with button 1002, even though button 1004 may be completely independent of button 1002. Button 1004 comprises a affiliation indicator for "TV Guide Online", an text information "Find out more about Calista at TV Guide online", and a Uniform Resource Locator (URL) for "www.tvguide.com". By selecting the URL in button 1004 when the electronic program guide is implemented as an interactive television program guide or an online television program guide, the electronic program guide may present a web browser containing the corresponding web page.

Figure 11:
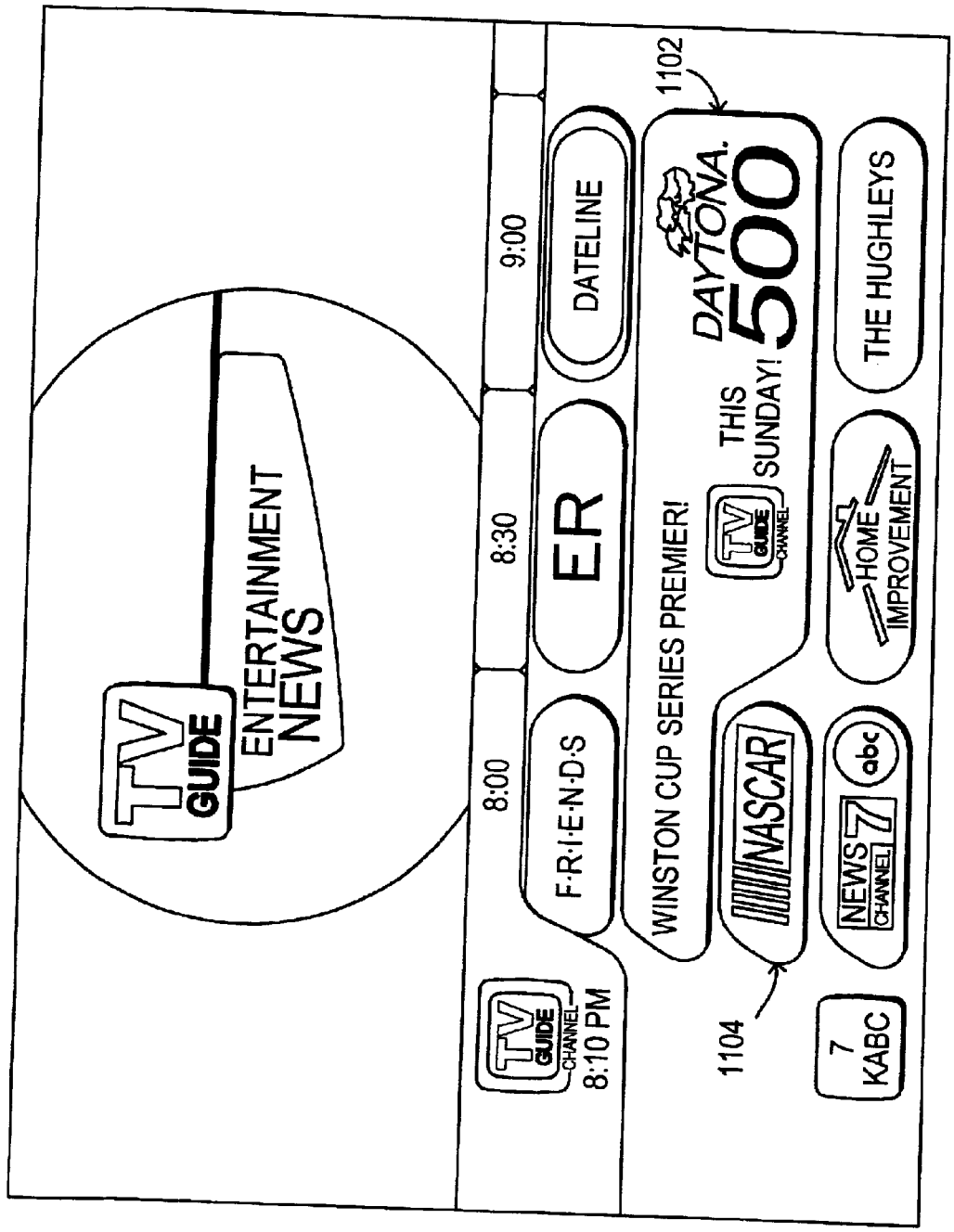
FIG. 11 is an illustration of an electronic program guide display screen showing a promotion button and an advertising button that may be presented in accordance with some embodiments of the present invention.
Figure 12:
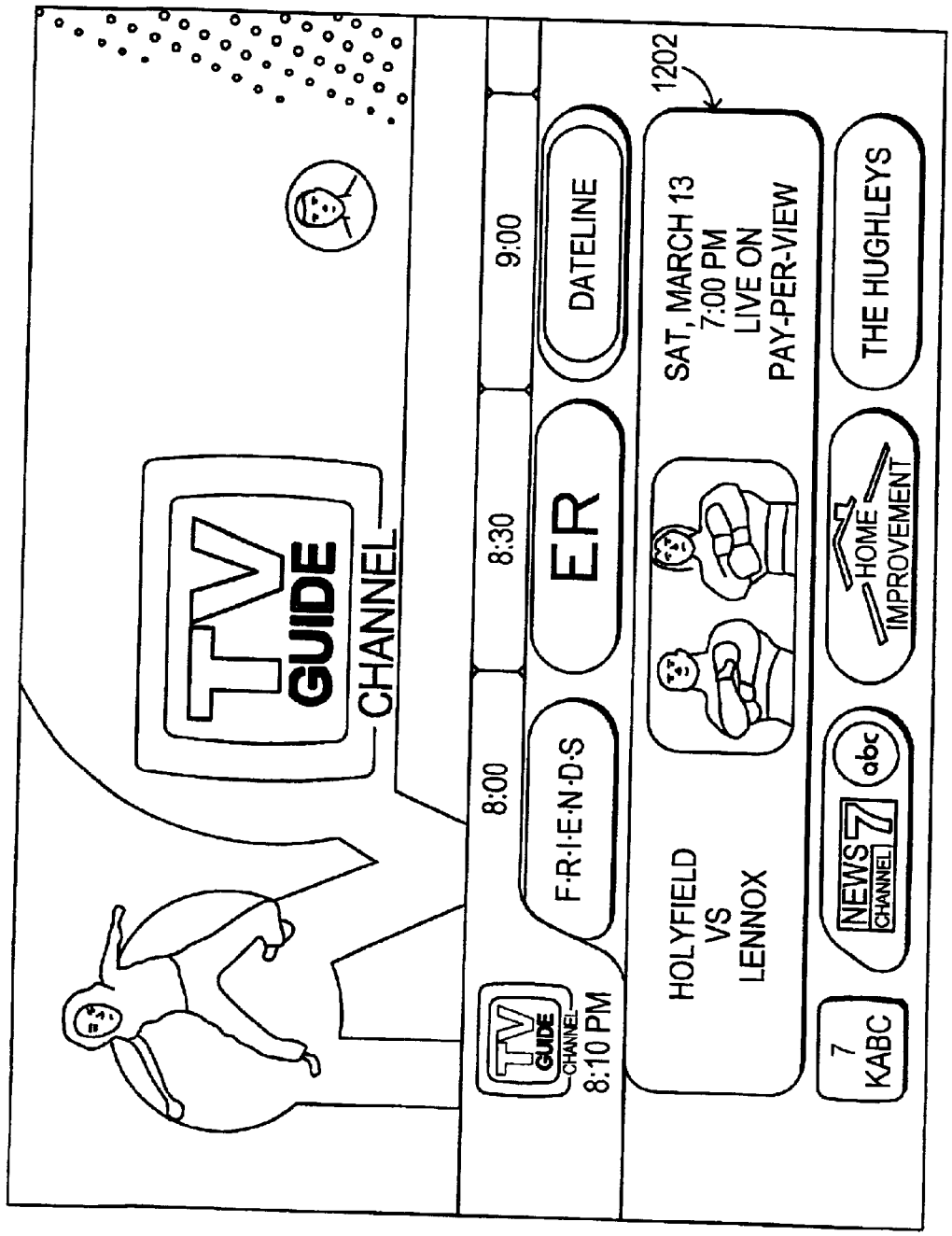
FIG. 12 is an illustration of an electronic program guide display screen showing a promotion button that may be presented in accordance with some embodiments of the present invention.

Two other forms of promotion buttons are illustrated in FIGS. 11 and 12. As shown in FIG. 11, a promotion button 1102 may be used to promote an event such as the "Daytona 500". In conjunction with this promotion, button 1102 may also include a slogan "Winston Cup Series premier!", an affiliation indicator "TV Guide Channel", and text information "This Sunday!". An advertising button 1104 may also be used in conjunction with promotion button 1102. As shown, button 1104 shows the logo for "NASCAR" to advertise "NASCAR" auto racing. By placing advertising button 1104 near promotion button 1102, viewers are aware of the association of their content.

As shown in FIG. 12, a promotion button 1202 may be used to promote an event such as the "Holyfield VS Lennox" boxing match as indicated by the text information "Holyfield VS Lennox". Also included in button 1202 is a celebrity image of the two fighters, and more text information indicating that the fight will be aired on "Sat, March 13" at "7:00 PM" and will be "Live on Pay-Per-View".

The concepts shown and discussed in conjunction with the figures may be used in passive, interactive, and online guides. The arrangements of screen elements shown are merely illustrative. For example, see U.S. patent application Ser. No. 09/357,941, filed Jul. 16, 1999 and U.S. patent application Ser. No. 09/354,602, filed Jul. 16, 1999, which are hereby incorporated by reference herein in their entirety, for examples of arrangements of interactive program guides, and U.S. patent application Ser. No. 08/938,028, filed Sep. 18, 1997, which is hereby incorporated by reference herein in its entirety, for examples of arrangements of elements in an online program guide. The screens used in accordance with the present invention may or may not be partitioned into various sections containing, for example, program listings, video windows, advertisements, logos and screen titles, etc. Program listings may be in the form of a grid, a list sorted by time, channel, category, alphabetically, or in any other format.

In the interactive embodiments, the guide may allow the user to highlight any individual item and select it using a "Select", "Enter", "Ok", or similar key. In the online embodiments, the guide may allow the user to select any individual time by clicking on it using a mouse. Selectable items may include any button, logo, indicator, text, icon, etc.

Selecting an item may cause the guide to perform an action (such as tuning to a program) related to the item, display additional information related to the item, display a menu of options related to the item (e.g., watch, remind, lock, favorite, order, other air times, etc.), or other function.

The foregoing is merely illustrative of the principles of this invention and various modifications can be made by those skilled in the art without departing from the scope and spirit of the invention.

What is claimed is:

1. A method of presenting an electronic program guide, comprising:
    receiving program guide data; and
    presenting the program guide data as program listings for a plurality of television programs, wherein the title or name of at least one of the plurality of television programs is graphically branded to emulate the title or name of the television program as it appears in a broadcast.

2. The method of claim 1, wherein at least one of the television programs comprises a logo that corresponds to the television program being displayed in the program listings.

3. The method of claim 1, wherein at least one of the television programs comprises a celebrity image.

4. The method of claim 1, wherein at least one of the television programs comprises an affiliation indicator.

5. The method of claim 4, wherein the affiliation indicator identifies a network affiliate.

6. The method of claim 4, wherein the affiliation indicator identifies a sports team affiliate.

7. The method of claim 4, wherein the affiliation indicator identifies a corporate affiliate.

8. The method of claim 4, wherein the affiliation indicator identifies an event affiliate.

9. The method of claim 4, wherein the affiliation indicator identifies a guide affiliate.

10. The method of claim 4, wherein the affiliation indicator identifies a sponsor.

11. The method of claim 1, further comprising presenting text information in at least one of the program listings.

12. The method of claim 1, further comprising presenting an informational icon in at least one of the program listings.

13. The method of claim 1, further comprising presenting an information tray with the program listings.

14. The method of claim 13, further comprising presenting a legend in the information tray.

15. The method of claim 13, further comprising presenting weather information in the information tray.

16. The method of claim 13, further comprising presenting news information in the information tray.

17. The method of claim 13, further comprising presenting an advertising element in the information tray.

18. The method of claim 1, further comprising presenting the television programs as buttons.

19. The method of claim 1, further comprising displaying a guide provider logo and presenting channel indicators which are similar in style to the guide provider logo.

20. The method of claim 1, further comprising displaying an advertisement within the program listings.

21. The method of claim 20, wherein the advertisement includes a logo for a television program.

22. The method of claim 20, wherein the advertisement includes a celebrity image.

23. The method of claim 20, wherein the advertisement includes an affiliation indicator.

24. The method of claim 1, further comprising displaying a promotion within the program listings.

25. The method of claim 24, wherein the promotion includes a logo for a television program.

26. The method of claim 24, wherein the promotion includes a celebrity image.

27. The method of claim 24, wherein the promotion includes an affiliation indicator.

28. The method of claim 1, wherein the electronic program guide is a passive television program guide.

29. The method of claim 1, wherein the electronic program guide is an interactive television program guide.

30. The method of claim 1, wherein the electronic program guide is an online television program guide.

31. The method of claim 1, wherein the program listing are organized in a grid.

32. The method of claim 1, wherein the program listings are organized in a list.

33. The method of claim 1, wherein the program listings are selectable.

34. A system for presenting an electronic program guide, comprising:
    program guide provider equipment that transmits program guide data; and
    program guide display equipment that receives the program guide data and presents the program guide data as program listings for a plurality of television programs, wherein the title or name of at least one of the plurality of television programs is graphically branded to emulate the title or name of the television program as it appears in a broadcast.

35. The system of claim 34, wherein at least one of the television programs comprises a logo that corresponds to the television program being displayed in the program listings.

36. The system of claim 34, wherein at least one of the television programs comprises a celebrity image.

37. The system of claim 34, wherein at least one of the television programs comprises an affiliation indicator.

38. The system of claim 37, wherein the affiliation indicator identifies a network affiliate.

39. The system of claim 37, wherein the affiliation indicator identifies a sports team affiliate.

40. The system of claim 37, wherein the affiliation indicator identifies a corporate affiliate.

41. The system of claim 37, wherein the affiliation indicator identifies an event affiliate.

42. The system of claim 37, wherein the affiliation indicator identifies a guide affiliate.

43. The system of claim 37, wherein the affiliation indicator identifies a sponsor.

44. The system of claim 34, wherein the program guide display equipment presents text information in at least one of the program listings.

45. The system of claim 34, wherein the program guide display equipment presents an informational icon in at least one of the program listings.

46. The system of claim 34, wherein the program guide display equipment presents an information tray with the program listings.

47. The system of claim 46, wherein the program guide display equipment presents a legend in the information tray.

48. The system of claim 46, wherein the program guide display equipment presents weather information in the information tray.

49. The system of claim 46, wherein the program guide display equipment presents news information in the information tray.

50. The system of claim 46, wherein the program guide display equipment presents an advertising element in the information tray.

51. The system of claim 34, wherein the program guide display equipment presents the program listings as buttons.

52. The system of claim 34, wherein the program guide display equipment displays a guide provider logo and presents channel indicators which are similar in style to the guide provider logo.

53. The system of claim 34, wherein the program guide display equipment displays an advertisement within the program listings.

54. The system of claim 53, wherein the advertisement includes a logo for a television program.

55. The system of claim 53, wherein the advertisement includes a celebrity image.

56. The system of claim 53, wherein the advertisement includes an affiliation indicator.

57. The system of claim 34, wherein the program guide display equipment displays a promotion within the program listings.

58. The system of claim 57, wherein the promotion includes a logo for a television program.

59. The system of claim 57, wherein the promotion includes a celebrity image.

60. The system of claim 57, wherein the promotion includes an affiliation indicator.

61. The system of claim 34, wherein the electronic program guide is a passive television program guide.

62. The system of claim 34, wherein the electronic program guide is an interactive television program guide.

63. The system of claim 34, wherein the electronic program guide is an online television program guide.

64. The system of claim 34, wherein the program listings are organized in a grid.

65. The system of claim 34, wherein the program listings are organized in a list.

66. The system of claim 34, wherein the program listings are selectable.

* * * * *

UNITED STATES PATENT AND TRADEMARK OFFICE
CERTIFICATE OF CORRECTION

| | | |
|---|---|---|
| PATENT NO. | : 6,938,208 C1 | Page 1 of 1 |
| APPLICATION NO. | : 90/020029 | |
| DATED | : June 10, 2015 | |
| INVENTOR(S) | : M. Scott Reichardt | |

It is certified that error appears in the above-identified patent and that said Letters Patent is hereby corrected as shown below:

In the Title Page

Item (54), please replace Title "ELECTRONIC PROGRAM GUIDE WITH GRAPHIC PROGRAMS LISTINGS" with Title --ELECTRONIC PROGRAM GUIDE WITH GRAPHIC PROGRAM LISTINGS--.

Item (73), please replace Assignee "JPMorgan Chase Bank, N.A., New York, NY (US)" with Assignee --Rovi Guides, Inc., Santa Clara, CA (US)--.

Signed and Sealed this
First Day of December, 2015

Michelle K. Lee
*Director of the United States Patent and Trademark Office*

(12) EX PARTE REEXAMINATION CERTIFICATE (10628th)
United States Patent
Reichardt

(10) Number: US 6,938,208 C1
(45) Certificate Issued: Jun. 10, 2015

(54) ELECTRONIC PROGRAM GUIDE WITH GRAPHIC PROGRAMS LISTINGS

(75) Inventor: M. Scott Reichardt, Tulsa, OK (US)

(73) Assignee: JPMORGAN CHASE BANK, N.A., New York, NY (US)

Reexamination Request:
No. 90/020,029, Sep. 14, 2012

Reexamination Certificate for:
Patent No.: 6,938,208
Issued: Aug. 30, 2005
Appl. No.: 09/754,753
Filed: Jan. 4, 2001

Related U.S. Application Data

(60) Provisional application No. 60/174,443, filed on Jan. 4, 2000.

(51) Int. Cl.
*G06F 3/00* (2006.01)
*H04N 5/44* (2011.01)
*H04N 5/445* (2011.01)

(52) U.S. Cl.
CPC ......... *H04N 5/4403* (2013.01); *H04N 5/44543* (2013.01)

(58) Field of Classification Search
None
See application file for complete search history.

(56) References Cited

To view the complete listing of prior art documents cited during the proceeding for Reexamination Control Number 90/020,029, please refer to the USPTO's public Patent Application Information Retrieval (PAIR) system under the Display References tab.

*Primary Examiner* — Dennis Bonshock

(57) ABSTRACT

Electronic program guides in which program listings may be graphically presented and in which sponsors and celebrities of those programs may be identified are provided. The electronic programs guides may be passive television program guides, interactive television program guides, and/or on-line television program guides. Television show text information, logos and/or trademarks, celebrity images, affiliation indicators, and advertisements may be present in the program listings to enhance the electronic program guides.

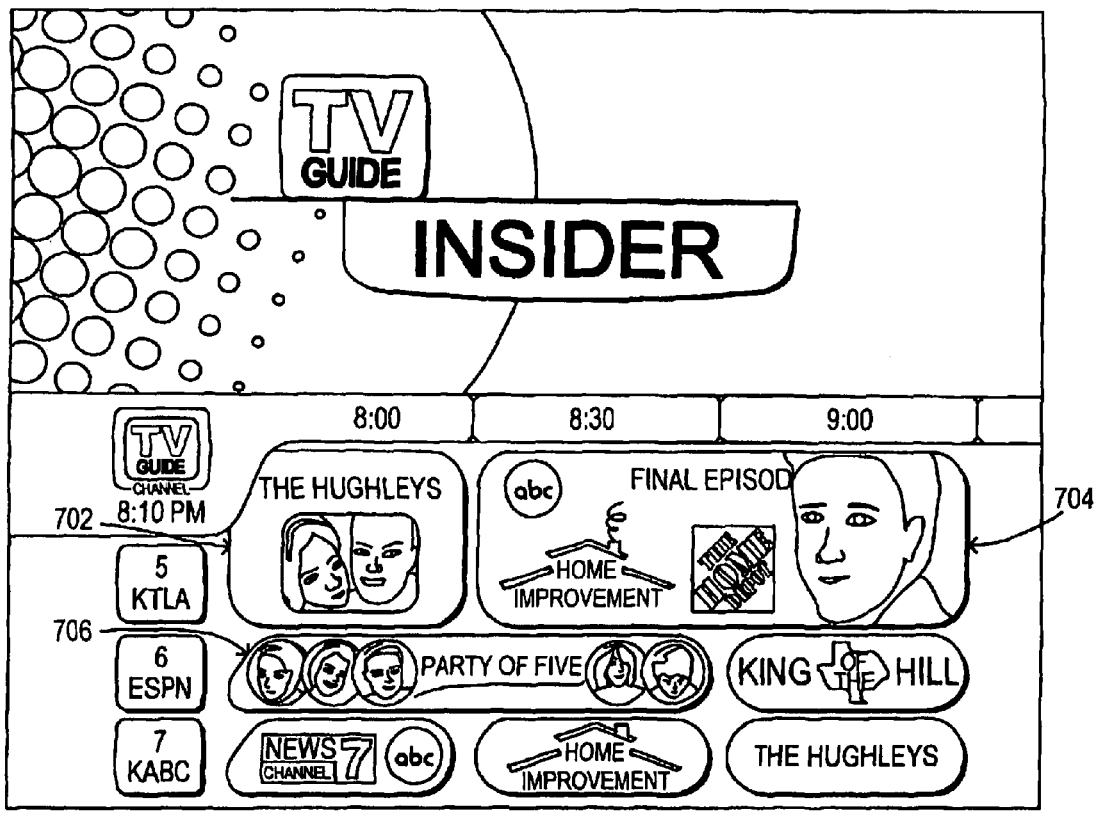

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-66 are cancelled.

New claims 67-76 are added and determined to be patentable.

67. *A method of presenting an electronic program guide, comprising:*
   *receiving program guide data;*
   *presenting the program guide data as program listings for a plurality of television programs, wherein the title or name of at least one of the plurality of television programs is graphically branded to emulate the title or name of the television program as it appears in a broadcast;*
   *presenting an information tray with the program listings; and*
   *presenting a legend in the information tray.*

68. *A method of presenting an electronic program guide, comprising:*
   *receiving program guide data;*
   *presenting the program guide data as program listings for a plurality of television programs, wherein the title or name of at least one of the plurality of television programs is graphically branded to emulate the title or name of the television program as it appears in a broadcast; and*
   *displaying an advertisement within the program listings, wherein the advertisement includes a logo for a television program.*

69. *A method of presenting an electronic program guide, comprising:*
   *receiving program guide data;*
   *presenting the program guide data as program listings for a plurality of television programs, wherein the title or name of at least one of the plurality of television programs is graphically branded to emulate the title or name of the television program as it appears in a broadcast; and*
   *displaying an advertisement within the program listings, wherein the advertisement includes a celebrity image.*

70. *A method of presenting an electronic program guide, comprising:*
   *receiving program guide data;*
   *presenting the program guide data as program listings for a plurality of television programs, wherein the title or name of at least one of the plurality of television programs is graphically branded to emulate the title or name of the television program as it appears in a broadcast; and*
   *displaying a promotion within the program listings, wherein the promotion includes a logo for a television program.*

71. *A method of presenting an electronic program guide, comprising:*
   *receiving program guide data;*
   *presenting the program guide data as program listings for a plurality of television programs, wherein the title or name of at least one of the plurality of television programs is graphically branded to emulate the title or name of the television program as it appears in a broadcast; and*
   *displaying a promotion within the program listings, wherein the promotion includes a celebrity image.*

72. *A system for presenting an electronic program guide, comprising:*
   *program guide provider equipment that transmits program guide data; and*
   *program guide display equipment that receives the program guide data and presents:*
     *the program guide data as program listings for a plurality of television programs, wherein the title or name of at least one of the plurality of television programs is graphically branded to emulate the title or name of the television program as it appears in a broadcast;*
     *an information tray with the program listings; and*
     *a legend in the information tray.*

73. *A system for presenting an electronic program guide, comprising:*
   *program guide provider equipment that transmits program guide data; and*
   *program guide display equipment that receives the program guide data and presents:*
     *the program guide data as program listings for a plurality of television programs, wherein the title or name of at least one of the plurality of television programs is graphically branded to emulate the title or name of the television program as it appears in a broadcast; and*
     *an advertisement within the program listings, wherein the advertisement includes a logo for a television program.*

74. *A system for presenting an electronic program guide, comprising:*
   *program guide provider equipment that transmits program guide data; and*
   *program guide display equipment that receives the program guide data and presents:*
     *the program guide data as program listings for a plurality of television programs, wherein the title or name of at least one of the plurality of television programs is graphically branded to emulate the title or name of the television program as it appears in a broadcast; and*
     *an advertisement within the program listings, wherein the advertisement includes a celebrity image.*

75. *A system for presenting an electronic program guide, comprising:*
   *program guide provider equipment that transmits program guide data; and*
   *program guide display equipment that receives the program guide data and presents:*
     *the program guide data as program listings for a plurality of television programs, wherein the title or name of at least one of the plurality of television programs is graphically branded to emulate the title or name of the television program as it appears in a broadcast; and*
     *a promotion within the program listings, wherein the promotion includes a logo for a television program.*

76. A system for presenting an electronic program guide, comprising:
   program guide provider equipment that transmits program guide data; and
   program guide display equipment that receives the program guide data and presents:
      the program guide data as program listings for a plurality of television programs, wherein the title or name of at least one of the plurality of television programs is graphically branded to emulate the title or name of the television program as it appears in a broadcast; and
      a promotion within the program listings, wherein the promotion includes a celebrity image.

* * * * *